(12) United States Patent
Sassi et al.

(10) Patent No.: US 10,407,195 B2
(45) Date of Patent: Sep. 10, 2019

(54) PICKUP AND DELIVERY STATION FOR PRODUCTS

(71) Applicant: GIMA S.P.A., Zola Predosa (IT)

(72) Inventors: Fabio Sassi, Bologna (IT); Matteo Cinesi, Bologna (IT)

(73) Assignee: GIMA S.P.A., Gessate (IT)

( * ) Notice: Subject to any disclaimer, the term of this patent is extended or adjusted under 35 U.S.C. 154(b) by 605 days.

(21) Appl. No.: 15/039,237

(22) PCT Filed: Aug. 5, 2014

(86) PCT No.: PCT/IB2014/063702
§ 371 (c)(1),
(2) Date: May 25, 2016

(87) PCT Pub. No.: WO2015/075571
PCT Pub. Date: May 28, 2015

(65) Prior Publication Data
US 2017/0036794 A1    Feb. 9, 2017

(30) Foreign Application Priority Data

Nov. 25, 2013  (IT) .............................. BO2013A0643

(51) Int. Cl.
*B65B 35/38*    (2006.01)
*B25J 15/06*    (2006.01)
(Continued)

(52) U.S. Cl.
CPC .......... *B65B 35/38* (2013.01); *B25J 15/0052* (2013.01); *B25J 15/0616* (2013.01); *B65B 5/08* (2013.01);
(Continued)

(58) Field of Classification Search
CPC ... B65B 35/38; B25J 15/0052; B25J 15/0616; B65G 47/918
See application file for complete search history.

(56) References Cited

U.S. PATENT DOCUMENTS 3,302,967 A * 2/1967 Harris .................. B66C 1/0212
                                                294/65
4,199,050 A * 4/1980 Moller .................... B65B 21/20
                                                198/429
(Continued)

FOREIGN PATENT DOCUMENTS

| EP | 2441687 A1 | 4/2012 |
|---|---|---|
| GB | 2207413 A | 2/1989 |
| IT | BO20080547 A1 | 3/2010 |

OTHER PUBLICATIONS

International Search Report dated Dec. 23, 2014 re: Application No. PCT/IB2014/063702; pp. 1-4; citing: US 2013/299310 A1, U.S. Pat. No. 6,439,631 B1, GB 2 207 413 A, US 2004/130085 A1, EP 2 441 687 A1, IT BO20 080 547 A1 and U.S. Pat. No. 5,639,203 A.
(Continued)

*Primary Examiner* — Gerald McClain
(74) *Attorney, Agent, or Firm* — Cantor Colburn LLP (57) ABSTRACT

A pickup and delivery station for products includes a movement arm that is articulated with respect to a fixed frame and supports, at its free end, at least one respective grip component for a product. The free end of the arm includes at least one track for two carriages for supporting at least one respective shaft that supports the grip component. A linear actuator, which is substantially parallel to the direction of the track, is associated with one of the carriages for its movement along the track, from a configuration of separation from the other carriage to a configuration of proximity thereto. The shaft of a respective grip component is coupled to a second linear actuator that is perpendicular to the first (Continued)

one for the offset of the respective grip component with respect to the contiguous ones.

7 Claims, 13 Drawing Sheets

(51) Int. Cl.
    *B25J 15/00*     (2006.01)
    *B65G 47/91*     (2006.01)
    *B65B 5/08*     (2006.01)
    *B65B 5/10*     (2006.01)
    *B65B 29/02*     (2006.01)

(52) U.S. Cl.
    CPC ............ *B65B 5/105* (2013.01); *B65B 29/022* (2017.08); *B65G 47/918* (2013.01)

(56) References Cited

U.S. PATENT DOCUMENTS

| | | | | |
|---|---|---|---|---|
| 4,892,183 A * | 1/1990 | Fenton | ................. | B65G 47/907 198/436 |
| 5,177,434 A * | 1/1993 | Suzuki | .................... | G01R 1/04 198/395 |
| 5,575,376 A * | 11/1996 | Colamussi | ........... | B65G 47/918 198/468.3 |
| 5,639,203 A * | 6/1997 | Lee | .................... | H05K 13/0482 414/416.02 |
| 5,839,769 A * | 11/1998 | Slocum | .................. | B65G 47/26 294/87.1 |
| 6,068,317 A * | 5/2000 | Park | ........................ | H01L 21/68 294/65 |
| 6,439,631 B1 * | 8/2002 | Kress | ................... | B65G 47/918 294/65 |
| 8,776,984 B2 * | 7/2014 | Monti | .................... | B65B 35/38 198/432 |
| 9,611,102 B2 * | 4/2017 | Job | ........................ | B65G 47/71 |
| 2004/0130085 A1 * | 7/2004 | Lim | ........................ | B23Q 5/40 269/58 |
| 2012/0233967 A1 * | 9/2012 | Bellante | ................ | B25J 9/0084 53/443 |
| 2013/0115033 A1 * | 5/2013 | Lukes | .................... | B65B 35/24 414/564 |
| 2013/0299310 A1 * | 11/2013 | Begin | .................. | B65G 47/082 198/459.1 |

OTHER PUBLICATIONS

Written Opinion dated Dec. 23, 2014 re: Application No. PCT/IB2014/063702; pp. 1-4; citing: US 2013/299310 A1, U.S. Pat. No. 6,439,631 B1, GB 2 207 413 A, US 2004/130085 A1, EP 2 441 687 A1, and IT BO20 080 547 A1.

\* cited by examiner

PICKUP AND DELIVERY STATION FOR PRODUCTS

CROSS-REFERENCE TO RELATED APPLICATIONS

This application is related to and claims the benefit of Italian Patent Application No. BO2013A000643, filed on Nov. 25, 2013 and PCT Application No. PCT/IB2014/063702, filed on Aug. 5, 2014, the contents of which are herein incorporated by reference in their entirety.

TECHNICAL FIELD

The present disclosure relates to a pickup and delivery station for products, particularly adapted for products with a mutually complementary shape and/or products that are identical and are arranged alternately upright and upturned.

BACKGROUND

Conventional packaging apparatuses are used to create a set of products that are mutually arranged according to a preset configuration and to insert them into a box or other package.

This type of apparatus is adapted to pick up products from a specific storage area of a workstation upstream (which is adapted to sort them according to preset criteria) by way of corresponding grip means.

Each apparatus further comprises movement elements that are adapted to transfer the products that have been picked up with the grip means into the specific package.

Unfortunately, owing to the shape of the products and/or the dimensions of the package (it is sought to use packages of minimal dimensions in order to reduce encumbrances during the transport and storage of the finished packages), inserting the products into the package can be complex.

Errors during insertion can result in damage being done to the package (which usually is made of cardboard) or it being impossible to close it (because the products are arranged untidily inside it).

The technical solutions in order to overcome these drawbacks are particularly complex and involve the adoption of grip means that are provided with complicated movement elements.

Such movement elements are very costly and, since they are generally mutually functionally associated, they are also difficult to manage and maintain.

Lastly, it should be noted that even the versatility of the apparatus, in adopting conventional moving grip means, is not optimal in that it does not make it possible to implement any packaging format in a simple manner.

SUMMARY

The principal aim of the present disclosure is to solve the above mentioned drawbacks, by providing a pickup and delivery station for products which is simple and adapted to ensure high performance levels in terms of boxing speed.

Within this aim, the disclosure provides a pickup and delivery station for products which is simple to manage and maintain.

The disclosure also provides a pickup and delivery station for products which is versatile and adapted to pack the products in boxes of various different formats.

The present disclosure further provides a pickup and delivery station for products which is low cost, easily and practically implemented and safely applied.

A pickup and delivery station for products is provided, of the type comprising a movement arm that is articulated with respect to a fixed frame and supports, at its free end, at least one respective grip means for at least one product, characterized in that said five end of said arm comprises at least one track for at least two carriages for supporting at least one respective shaft that supports said grip means, a first linear actuator, which is substantially parallel to the direction of said track, being associated with one of said carriages for its movement along said track, from a configuration of separation from the other carriage to a configuration of proximity thereto, the at least one said shaft of a respective grip means being coupled to a second linear actuator, that is perpendicular to the first one, for the offset of the respective grip means with respect to the contiguous ones.

BRIEF DESCRIPTION OF THE DRAWINGS

Further characteristics and advantages of the disclosure will become better apparent from the description of a preferred, but not exclusive, embodiment of the pickup and delivery station for products according to the disclosure, which is illustrated by way of non-limiting example in the accompanying drawings wherein.

DETAILED DESCRIPTION OF THE DRAWINGS

With reference to the figures, the reference numeral 1 generally designates a pickup and delivery station for products A.

The products A can preferably be constituted by capsules for espresso coffee machines; however, the possibility is not ruled out of using the station 1 for picking up and delivering other products with a mutually complementary shape and/or products that are arranged alternately upright and upturned.

The products are then inserted by the station 1 into a box B, of suitable shape and size for containing a specific set of products A and/or of multiple groups of products A (delivered during successive and consecutive operations of the station 1).

The station 1 comprises a movement arm 2 that is articulated with respect to a fixed frame 3.

The arm 2 supports, at its free end, at least one respective grip means 4 for at least one product A.

The free end of the arm 2 in turn comprises at least one track 5 for at least two carriages 6 for supporting at least one respective shaft 7 that supports the grip means 4.

A first linear actuator 8, which is substantially parallel to the direction of the track 5, is associated with one of the carriages 6 for its movement along the track 5, from a configuration of separation from the other contiguous carriage 6 to a configuration of proximity thereto.

Each at least one shaft 7 of a respective grip means 4 is coupled to a second linear actuator 9 that is perpendicular to the first actuator 8 for the offset of the respective grip means 4 with respect to the contiguous ones.

According to a particular embodiment of undoubted practical and applicative interest, the tracks 5 are a plurality, are mutually side by side and are parallel, so as to define respective guide lanes for defined series of carriages 6 which can slide independently on each one of them.

It is convenient to note that each track 5 comprises preferably a plurality of carriages 6 which can slide: the carriage 6a, i.e. the farthest one from the end of the articulated arm 2, is fixed on the track 5 (integral with it) so as to constitute a stroke limiter for the other carriages 6 that are present on that track 5.

In this manner a pushing action exerted by the first actuator 8 determines the compaction (mutual approach) of the carriages 6 (and thus also of the grip means 4 that are integral therewith) into abutment against the fixed carriage 6a, which is arranged substantially at the end of the track 5.

More specifically, the first linear actuator 8 in such case comprises a rack-and-pinion assembly 10: the pinion is keyed to the shaft of a movement motor that is controlled by an adapted control and management unit; the rack 10, on the other hand, is integral with the carriage 6 that is closest to the end of the arm 2 (i.e., the carriage 6 that is closest to the rack 10).

The rotation of the motor determines the advancement/retraction of the rack 10, with consequent movement of the carriage 6 associated therewith.

The other carriages 6 which can slide on the same track 5 will follow the movements of the one that was actuated by the rack 10 according to the presence of adapted deviation and transmission elements, or according to the presence of elastic elements interposed between contiguous carriages 6.

In any case the stroke limiter reference point will always be constituted by the fixed carriage 6a.

The second linear actuator 9 is instead constituted by a cylinder, of type preferably selected from between pneumatic and hydraulic.

Of particular interest is the embodiment that involves the adoption of a pneumatic cylinder as the second linear actuator.

The shaft 7 is thus integral with the movable stem of the pneumatic cylinder 9, thus transmitting the movements imparted by the cylinder 9 to the grip means 4 arranged at its end, in order to vary the height thereof.

Generally, a respective second linear actuator 9 for the longitudinal translation of the shaft 7, with consequent height variation of the respective grip means 4, is interposed between each respective carriage 6 and each shaft 7 of each grip means 4 that is present thereon.

It should furthermore be noted that the grip means 4 comprises at least one sucker which is connected, by way of respective ducts, to centralized controlled suction means; at least one section of such ducts comprises at least one valve that is controlled by a control and management unit for the adjustment of the connection and disconnection times of the sucker to and from the suction means.

In fact it is necessary to have steps in which the suction means are directly connected to the sucker (which will then be adapted to lift at least one respective product A) and steps in which the sucker is disconnected (and thus prevented from supporting a product A).

The movement arm 2 articulated to a fixed frame 3 comprises, according to an embodiment that is particularly efficient and is simple to implement, a first beam 11 that is pivoted to the frame 3, a second beam 12 that is pivoted to the end 11a of the first beam 11, and a supporting bracket 13 for the at least one track 5 which is coupled rotatably to the end 12a of the second beam 12.

Movement elements are interposed between the frame 3 and the first beam 11, between the second beam 12 and the first beam 11 and between the bracket 13 and the second beam 12, and are controlled by the control and management unit that controls the entire device, in order to actuate the mutual rotations of such components.

In a preferred embodiment, which conforms to what is shown in the accompanying figures, the tracks 5 are mutually side by side on the bracket 13 according to groupings that comprise a predefined number of equidistant tracks 5.

The bracket 13 comprises preferably at least two side-by-side groupings, which are mutually separated by empty spaces: this makes it possible to define a number of sets of grip means 6 that will operate simultaneously to pick up and compact (or nest) the products A.

In particular a first set of grip means 4 could pick up respective products A, compact (nest) them and insert them into a specific box B.

A second set could then execute the same operation, thus depositing a second layer of products A into the box B. The number of superimposed layers will be such as to ensure that the box B is completely filled.

Operation of the station 1 is the following.

The arm 2 brings the grip means 4 proximate to and in alignment with respective products A that are present on a gathering surface on which they are neatly arranged.

Figure 7:
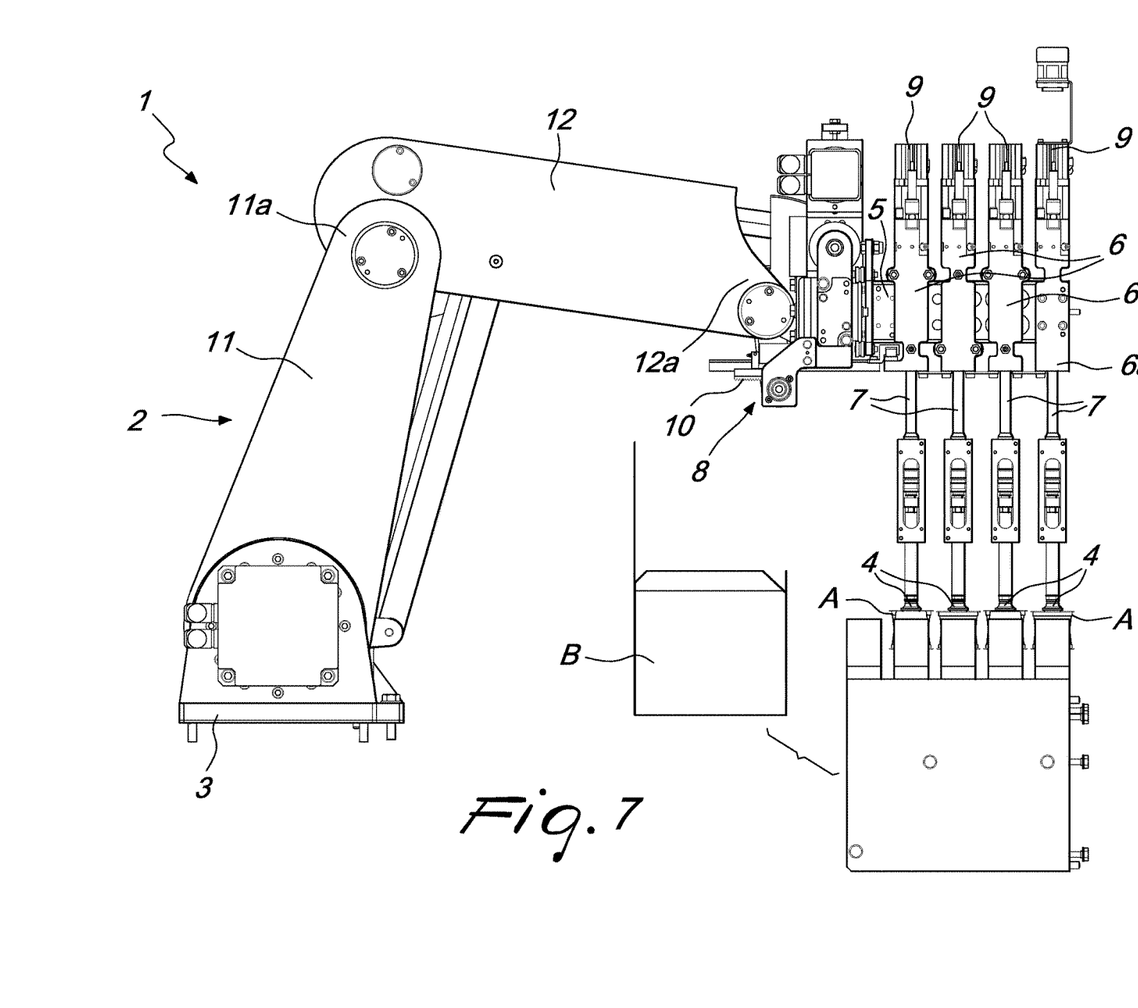
FIG. 7 is a front elevation view of the station in FIG. 4 in a first step of gripping the products.

The controlled valves activate the suction means and the suckers of the grip means 4 couple stably to the surface facing thereto of the product A (first step of gripping, shown in the accompanying FIG. 7).

Figure 8:
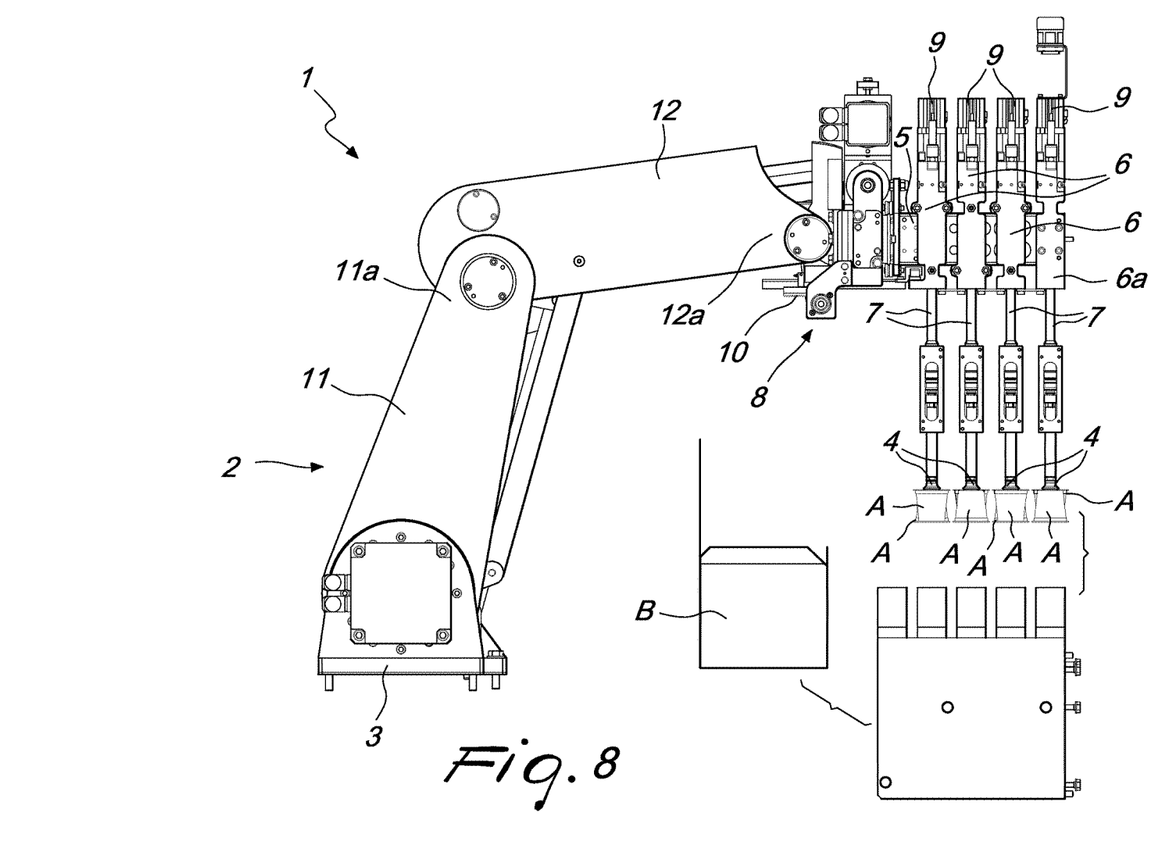
FIG. 8 is a front elevation view of the station in FIG. 4 in a second step of lifting the products.

The arm 2 will lift the products A (second step of lifting, shown in the accompanying FIG. 8).

Figure 9:
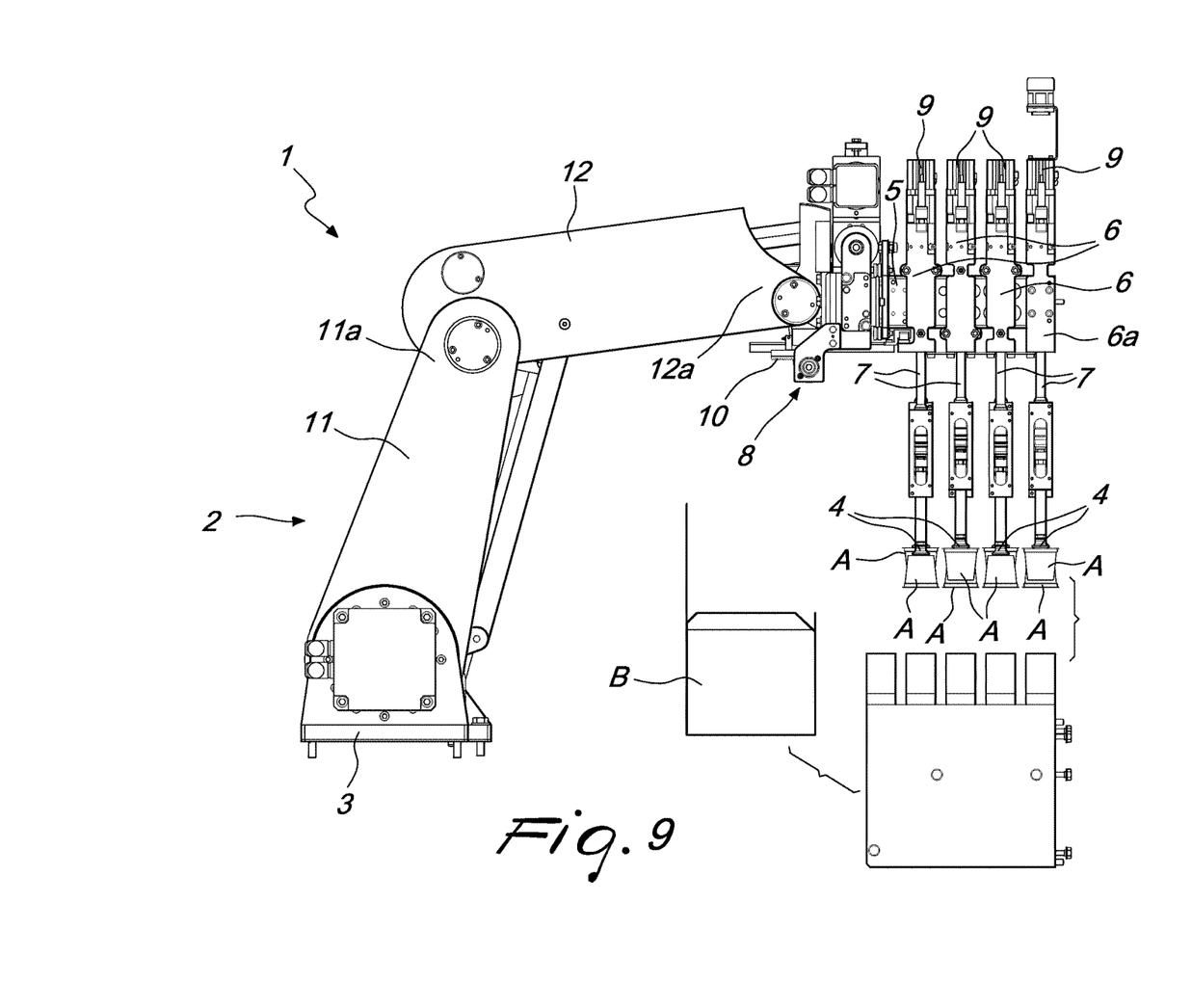
FIG. 9 is a front elevation view of the station in FIG. 4 in a third step of staggering the height of the products.

Thanks to the second actuators 9 (which are constituted by pneumatic cylinders in the preferred embodiment) it is then possible to stagger the products A, by staggering the grip means 4 by way of varying the height of some of the shafts 7 (third step of staggering the height, shown in the accompanying FIG. 9).

It should be noted that the staggering described in the previous paragraph is obtained by generating a variation in the height of alternate grip means 4: the criterion with which the grip means 4 will be raised, i.e. alternating with each other, is such that each grip means 4 will end up at a different height with respect to the contiguous ones (both longitudinally and transversely).

Figure 10:
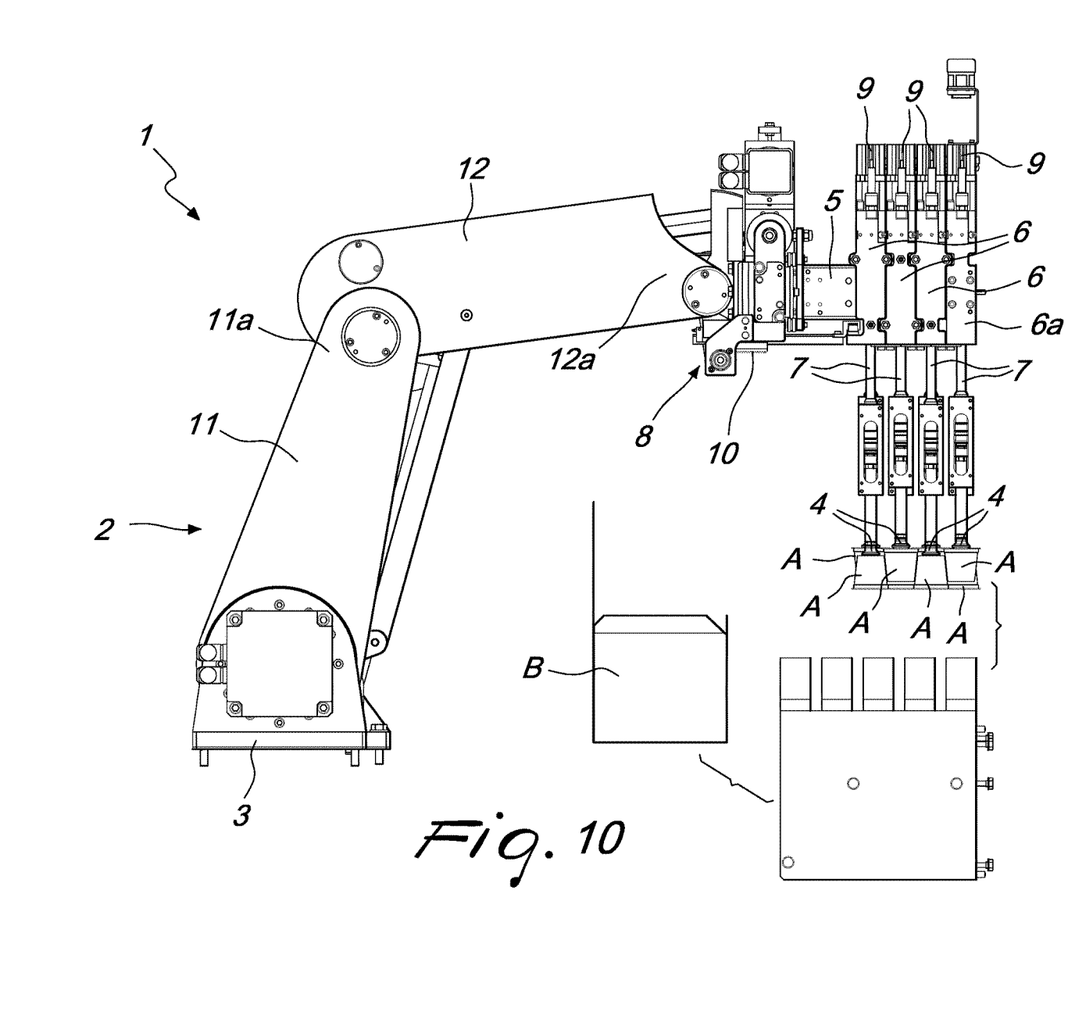
FIG. 10 is a front elevation view of the station in FIG. 4 in a fourth step of compaction of the products.

The first actuators 8 then bring the carriages 6 mutually closer together, with consequent compaction of the products A held by the grip means 4 (fourth step of compaction, or nesting, shown in the accompanying FIG. 10).

It should furthermore be noted that the compaction is preferably bidirectional: the second actuators 9, in an embodiment that is particularly efficient and functional, in fact also comprise a rail 8a along which the tracks 5 can slide transversely in order to bring the grip means 4 closer transversely as well during the compaction.

Therefore it can be seen that the grip means 4 undergo a mutual approach in the longitudinal direction thanks to the movement of the carriages 6 on the tracks 5 and a mutual approach in the transverse direction thanks to the movement of the tracks 5 on the rail 8a.

Obviously the rail 8a comprises respective controlled movement motors for managing the compaction of the tracks 5 which can slide thereupon.

The controlled movement motors can include a motor element that is associated with a drive cam that is coupled to the various different tracks 5: the possibility is not excluded of adopting any other type of conventional movement motor.

Figure 11:
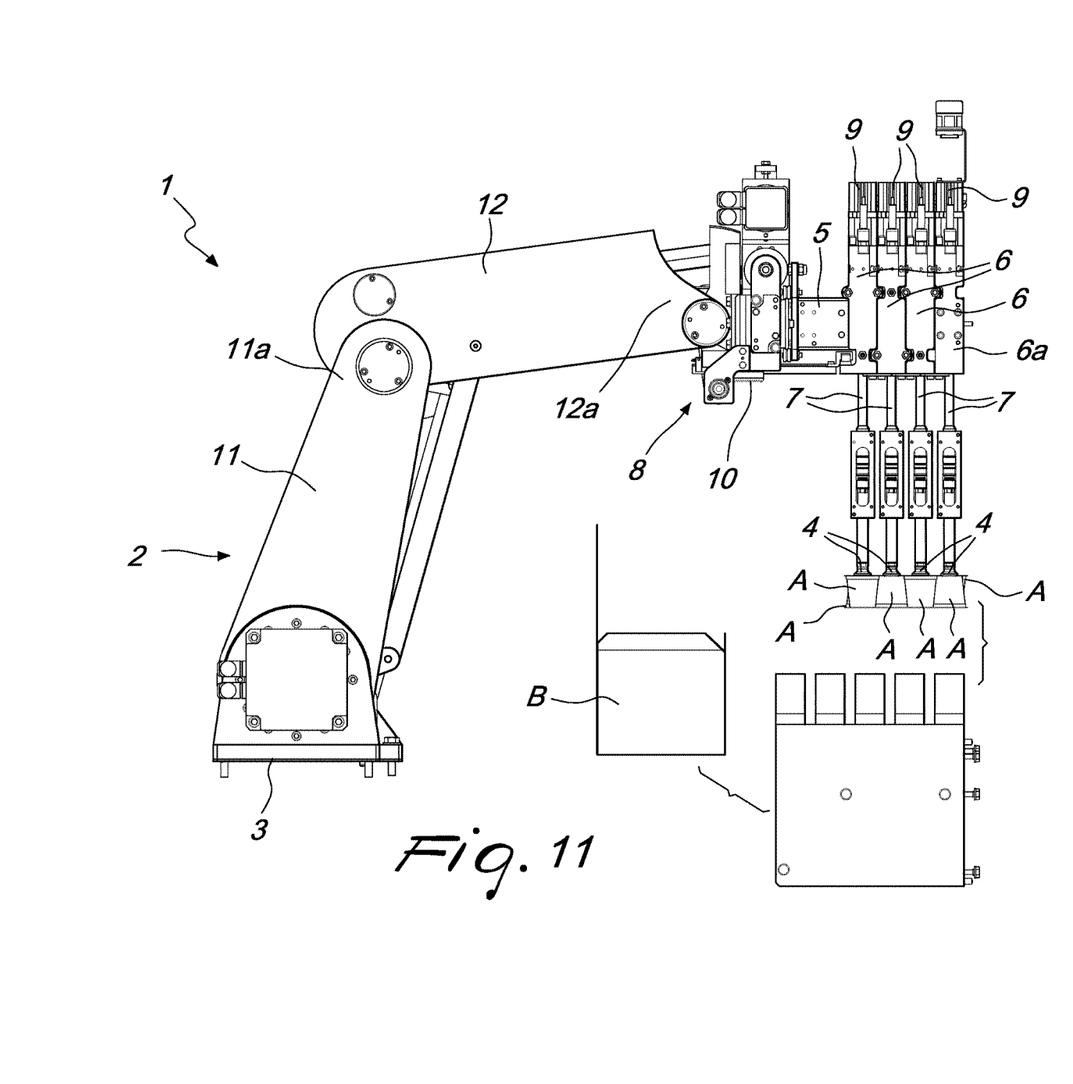
FIG. 11 is a front elevation view of the station in FIG. 4 in a fifth step of realigning the height of the products.

The second actuators 9 thus eliminate the staggering of the grip means (fifth step of realigning the compacted products, shown in the accompanying FIG. 11).

Figure 12:
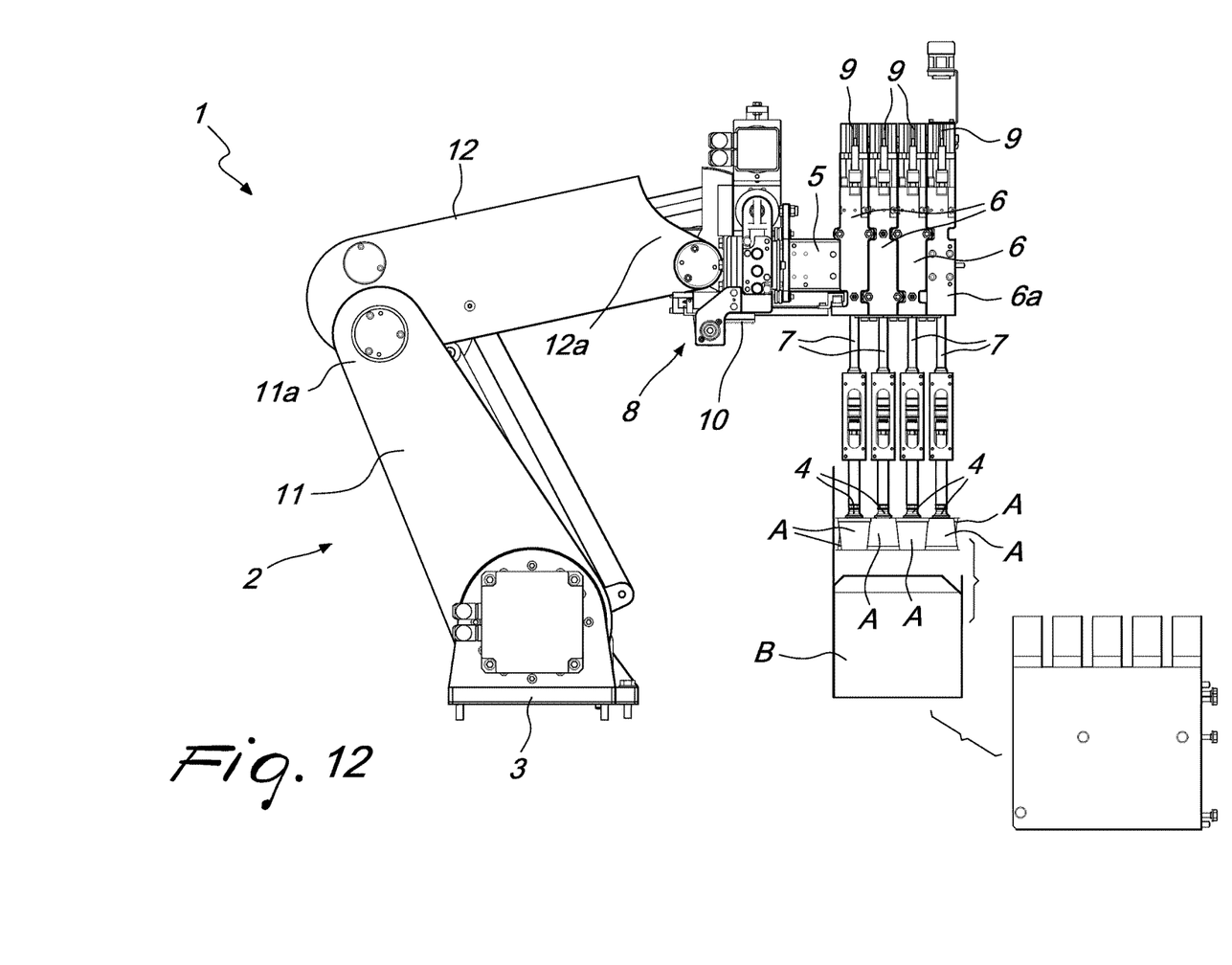
FIG. 12 is a front elevation view of the station in FIG. 4 in a sixth step of moving the compacted and realigned products.

The arm 2 at this point transfers the aligned and compacted products A to above of the box B (sixth step of moving the products A, shown in the accompanying FIG. 12).

Figure 13:
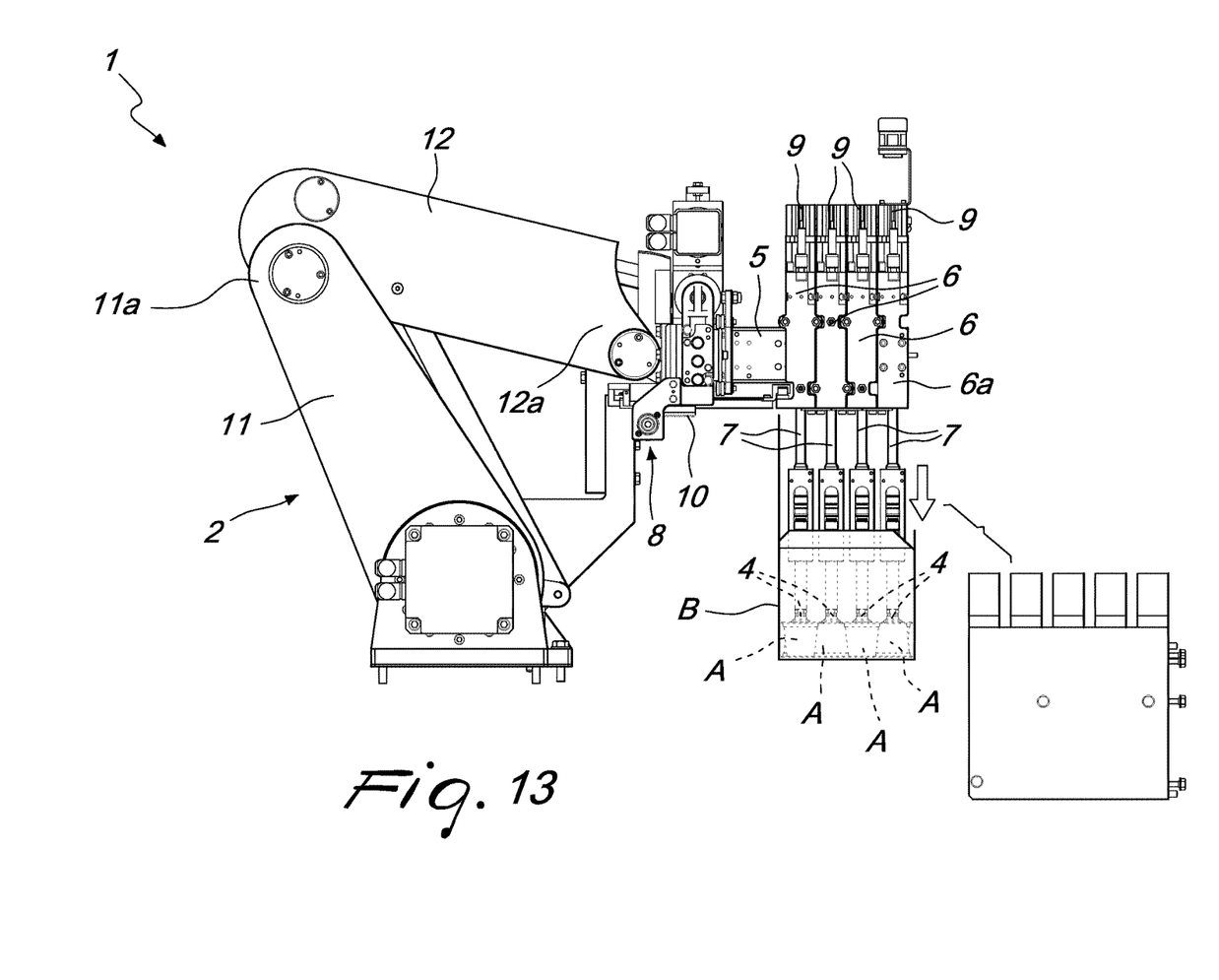
FIG. 13 is a front elevation view of the station in FIG. 4 in a seventh step of delivering the products to a specific packing box.

Then comes the delivery, transfer, of the products A to the box B (inside the box B proper) while keeping them compacted in order to ensure a minimization of their overall space occupation which will allow a greater ease of insertion into the box B (seventh step of delivering the products A, shown in the accompanying FIG. 13).

Figure 1:
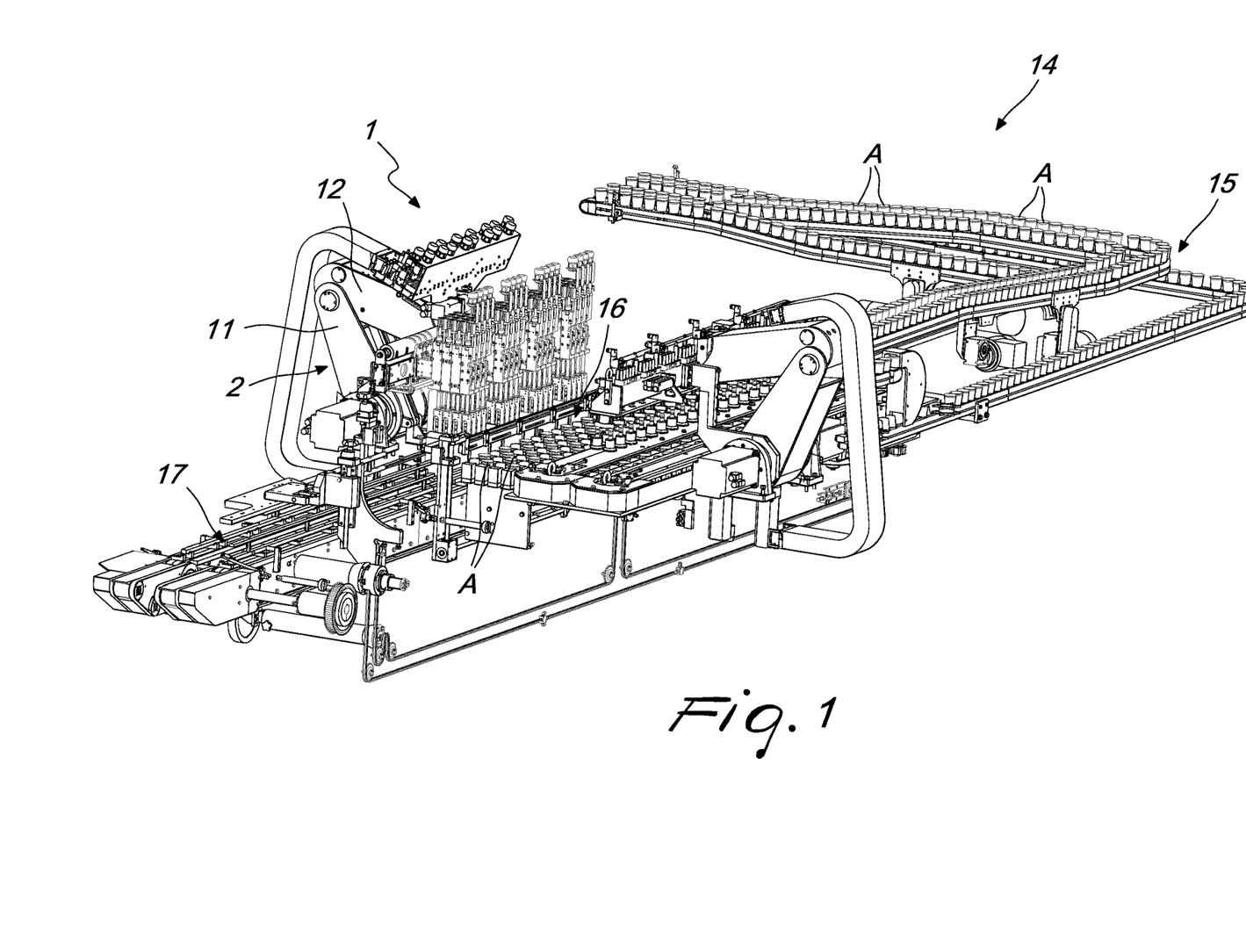
FIG. 1 is a perspective view of a machine for boxing products, which is provided with the pickup and delivery station for products according to the disclosure.
Figure 2:
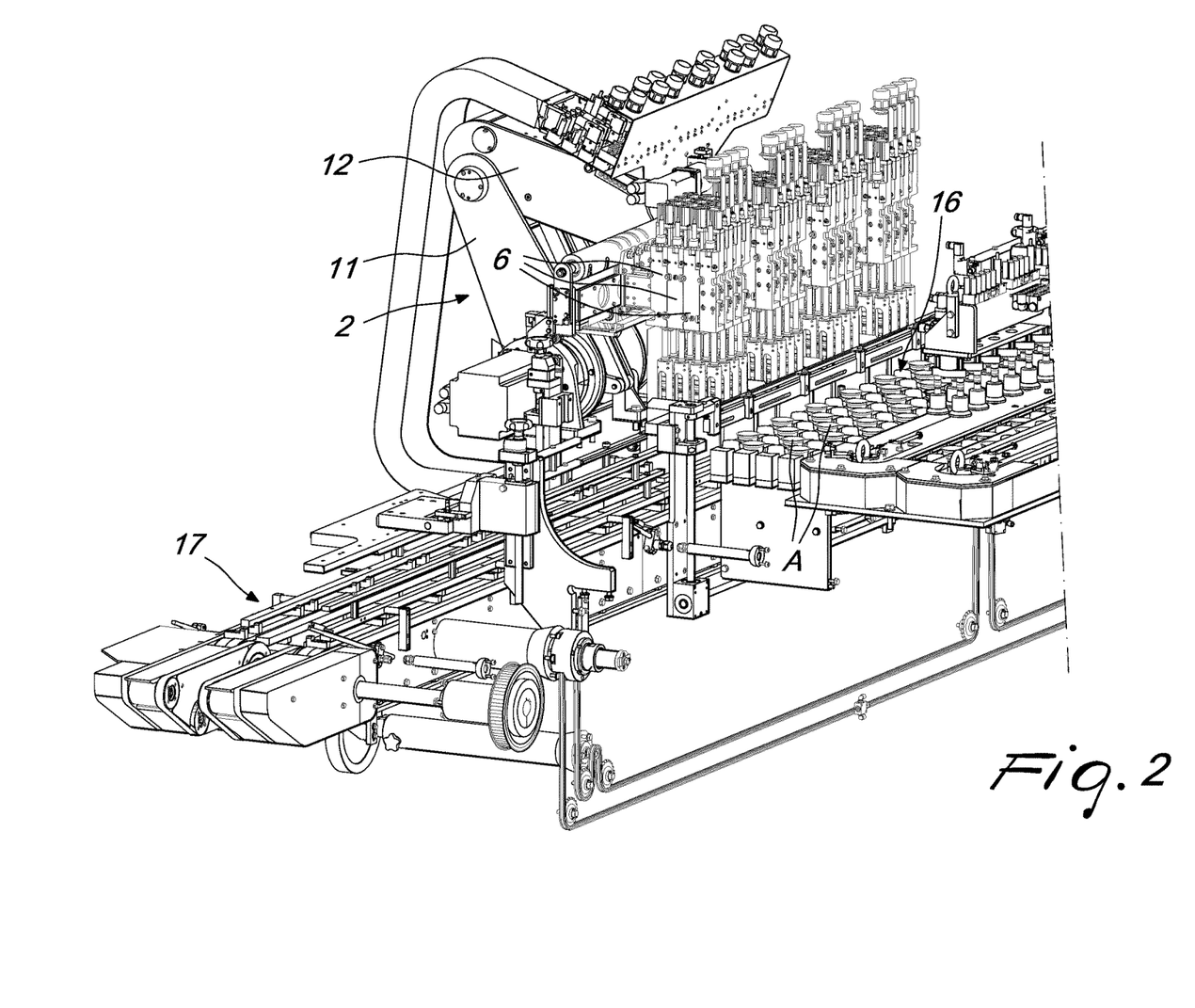
FIG. 2 is an enlarged view of FIG. 1.
Figure 3:
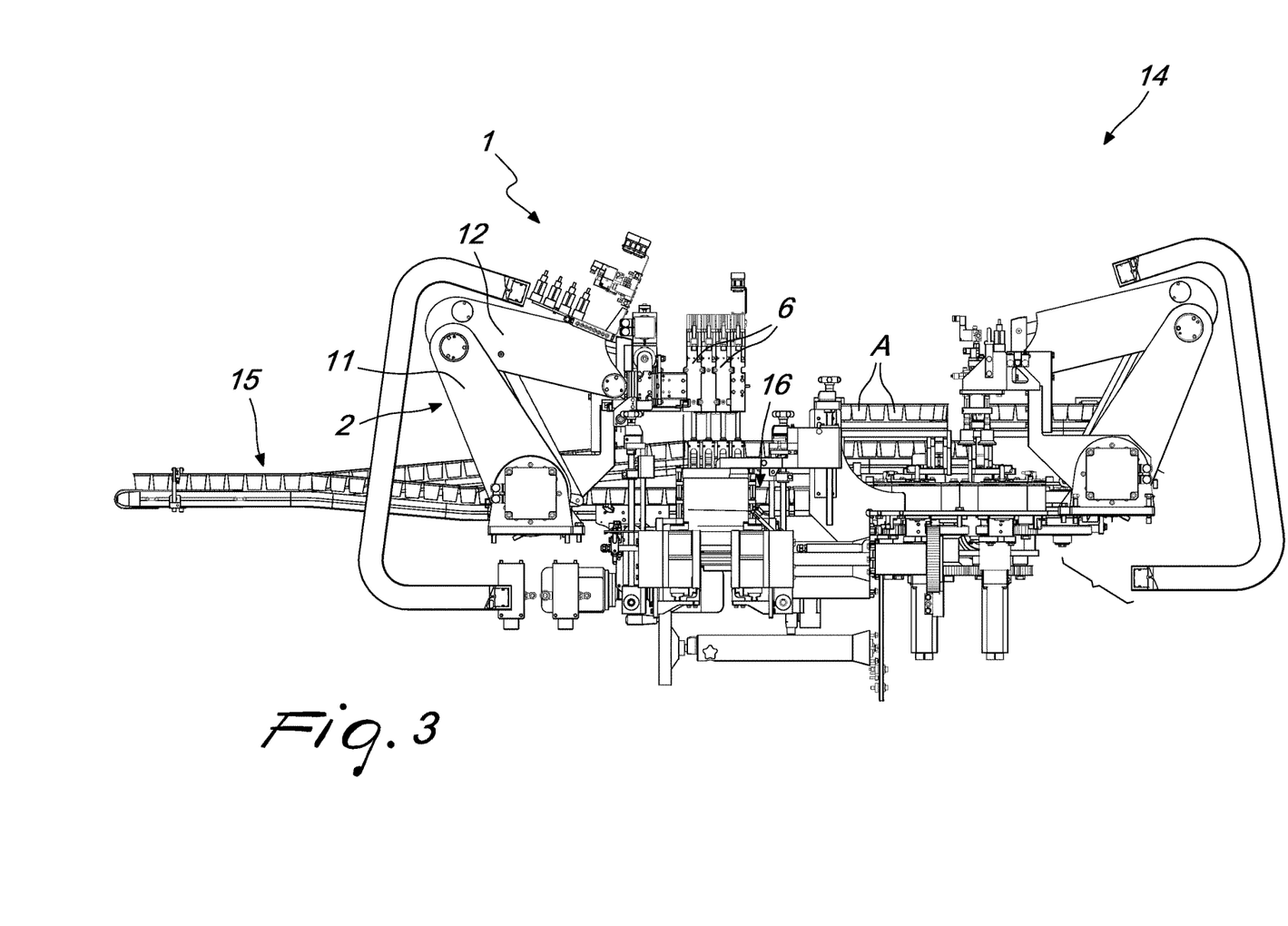
FIG. 3 is a front elevation view of the machine in FIG. 1.
Figure 4:
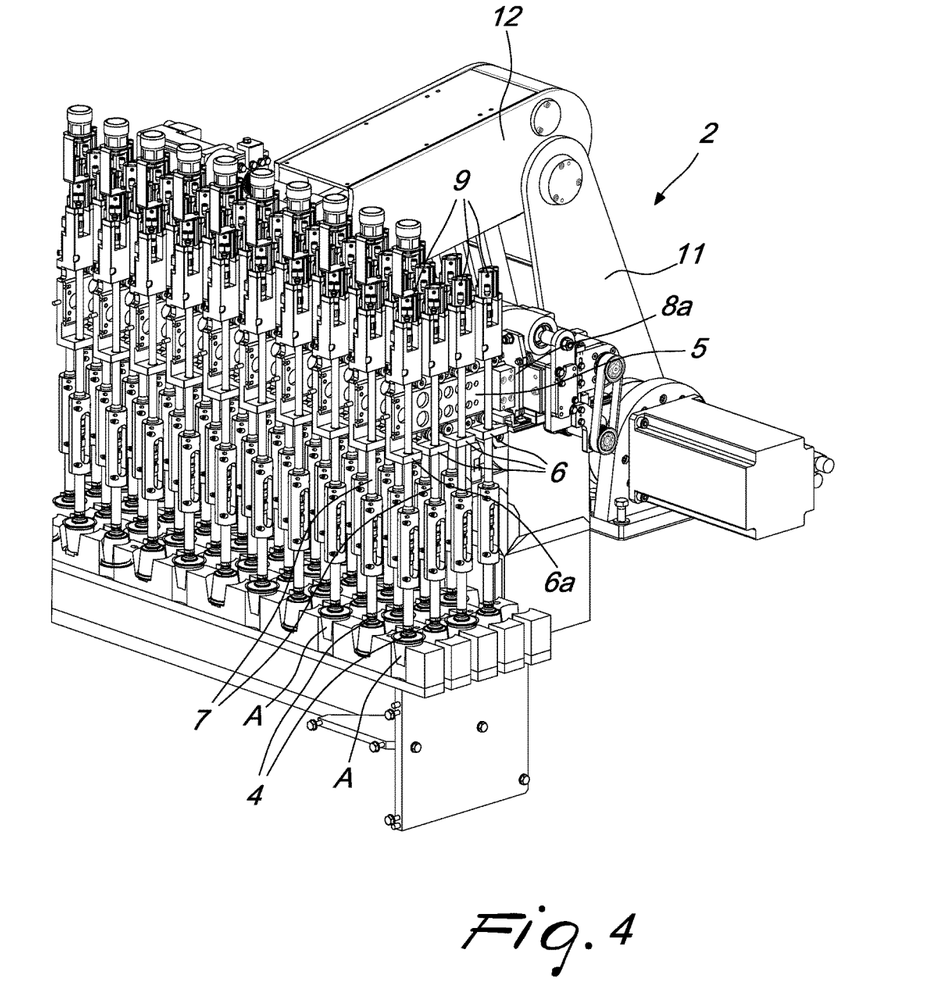
FIG. 4 is a perspective view of a pickup and delivery station for products according to the disclosure.
Figure 5:
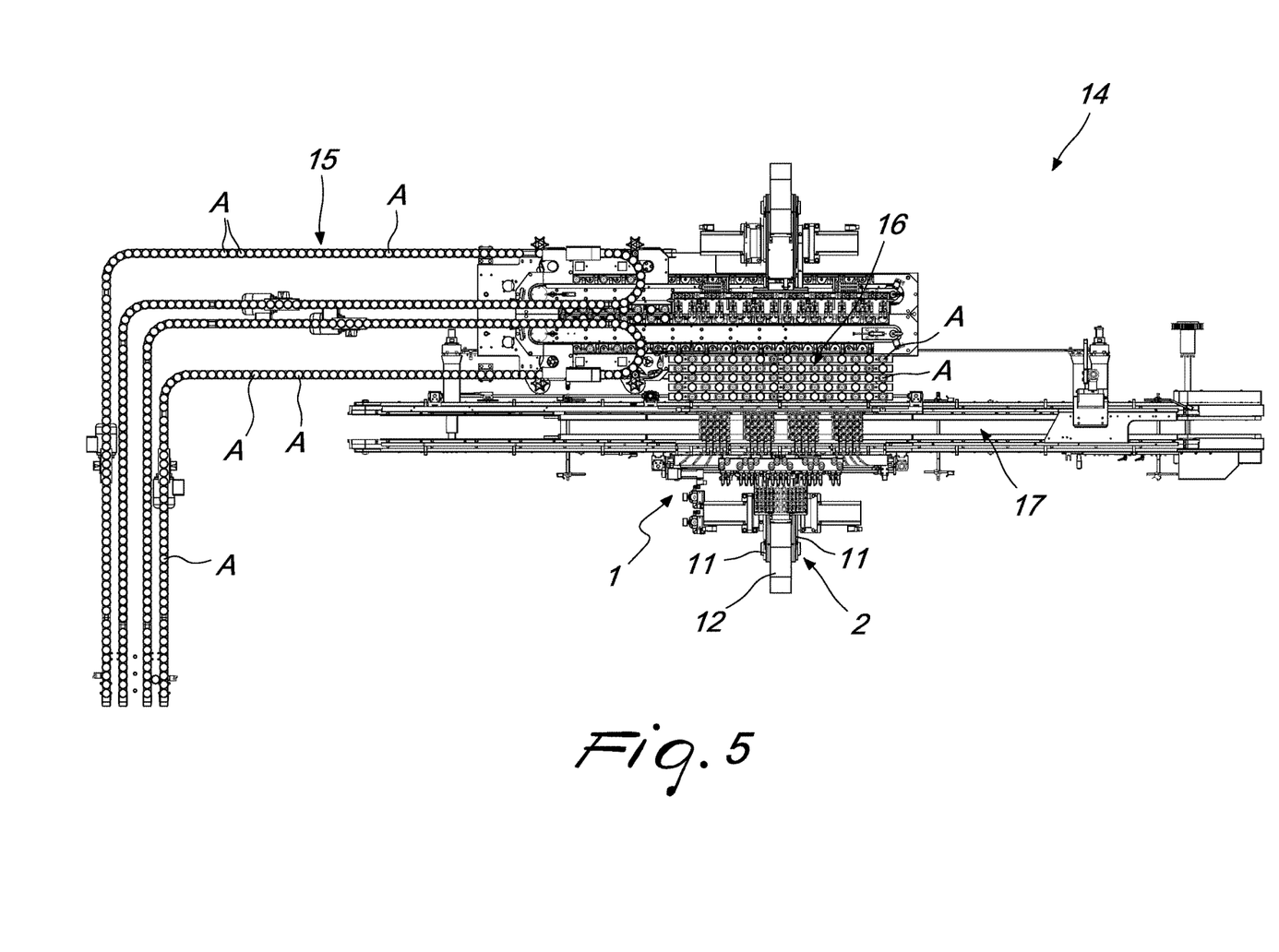
FIG. 5 is a view from above of the machine in FIG. 1.
Figure 6:
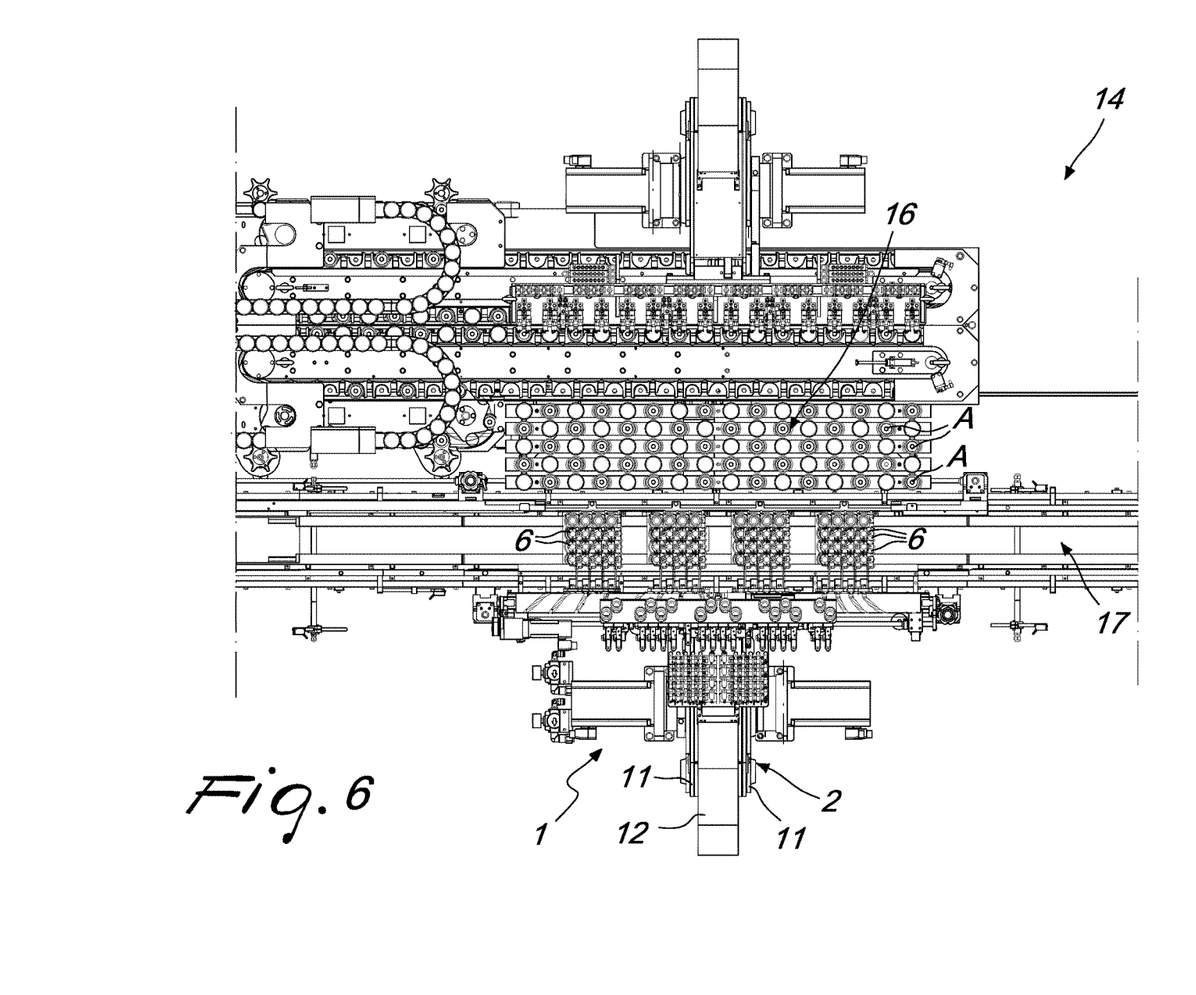
FIG. 6 is an enlarged view of FIG. 5.

It should be noted that the protection of the present disclosure also covers a machine 14 for boxing products A which comprises a line 15 for the supply and sorting of products A on a gathering surface 16 and at least one conveyance line 17 of boxes B, arranged to the side of the gathering surface 16.

Arranged externally to the conveyance line 17 of boxes B is a station 1 for picking up products A from the surface 16 and subsequently inserting them into a box B that is present on the conveyance line 17.

The station 1 comprises a movement arm 2 that is articulated with respect to a fixed frame 3.

The arm 2 supports, at its free end, at least one respective grip means 4 for at least one product A.

The free end of the arm 2 comprises at least one track 5 for at least two carriages 6 for supporting at least one respective shaft 7 that supports a grip means 4.

A first linear actuator 8, which is substantially parallel to the direction of the track 5, is associated with one of the carriages 6 for its movement along the track 5, from a configuration of separation from the other carriage 6 to a configuration of proximity thereto.

At least one shaft 7 of a grip means 4 is preferably coupled to a second linear actuator 9 that is perpendicular to the first actuator 8 for the offset of the respective grip means 4 with respect to the contiguous ones.

Advantageously the present disclosure solves the problems explained previously, by providing a pickup and delivery station 1 for products A which is simple and adapted to ensure high performance levels in terms of packaging speed (also with regard to the possibility of making successive, overlapped layers of products A in a single box B).

Effectively the station 1 is simple to manage and maintain: in fact it is constituted by unrelated components that facilitate substitution operations and which, in the event of malfunction, do not result in the overall outage of the station (but only a possible reduction in performance).

Profitably the station 1 is versatile and adapted to pack the products A in boxes of various different formats: in fact it is possible to reconfigure the groupings of tracks 5 in order to adapt them to the specific dimensions of the box B present on the line 17.

The disclosure, thus conceived, is susceptible of numerous modifications and variations; moreover, all the details may be substituted by other, technically equivalent elements.

In the embodiments illustrated, individual characteristics shown in relation to specific examples may in reality be interchanged with other, different characteristics, existing in other embodiments.

In practice, the materials employed, as well as the dimensions, may be any according to requirements and to the state of the art.

The invention claimed is:

1. A pickup and delivery station for products comprising:
a movement arm that is articulated with respect to a fixed frame and supports, at its free end, at least one respective grip means for at least one product, wherein said free end of said arm comprises at least one track for at least two carriages for supporting at least one respective shaft that supports said grip means,
a first linear actuator, which is substantially parallel to a direction of said track, being associated with a first one of said carriages for its movement along said track, from a configuration of separation from a second one of said carriages to a configuration of proximity thereto,
the at least one said shaft of a respective grip means being coupled to a second linear actuator, that is perpendicular to the first one, for the offset of the respective grip means with respect to the contiguous ones, each second actuator being adapted to stagger the height of contiguous grip means with which products are united, by way of a variation of height of the respective shafts, each first actuator being adapted to bring said carriages mutually closer, with consequent compaction of the contiguous products, which are held by the grip means at different heights, thus defining a group of products that is compacted/nested, having a smaller outline than an outline of a same number of products that are simply arranged side by side,
wherein said tracks are a plurality and are mutually side by side and parallel, wherein each of said tracks comprises a plurality of carriages, the carriage that lies furthest from said end of said arm being fixed on said track so as to constitute a stroke limiter for the other of said carriages that are present on said track, and
wherein said first linear actuator comprises a rack-and-pinion assembly, said pinion being keyed to the shaft of a movement motor that is controlled by a control unit, said rack-and-pinion being integral with the carriage that lies closest to the end of said arm, and with consequent height variation of the respective grip means between a first configuration of coplanarity of all of the grip means and a second configuration of height variation of each grip means with respect to the contiguous ones, in a longitudinal direction and in a transverse direction; and further comprising a rail along which said tracks are configured to slide transversely to bring said grip means closer transversely, the rail comprising respective controlled movement motors configured for managing the compaction of said tracks slidable thereon.

2. The station according to claim 1, wherein said second linear actuator is constituted by a cylinder of a type selected from pneumatic and hydraulic.

3. The station according to claim 1, wherein a respective second linear actuator for the longitudinal translation of said shaft, with consequent height variation of the respective grip means, is interposed between a carriage and each respective shaft of each grip means that is present thereon.

4. The station according to claim 1, wherein said grip means comprises at least one sucker which is connected, by way of respective ducts, to centralized controlled suction means, at least one section of said ducts comprising at least one valve that is controlled by said control unit for the adjustment of connection and disconnection times of said sucker to and from said suction means.

5. The station according to claim 1, wherein said movement arm articulated to a fixed frame comprises a first beam that is pivoted to said frame, a second beam that is pivoted to an end of said first beam, and a supporting bracket for said at least one track which is coupled rotatably to an end of said second beam, such that at least one movement component is interposed between each of said frame and said first beam, said second beam and said first beam, and said bracket and said second beam and being controlled by said control unit, in order to actuate mutual rotations of said components.

6. The station according to claim 5, wherein said tracks are mutually side by side on said bracket according to groupings that comprise a predefined number of equidistant tracks, said bracket comprising at least two side-by-side groupings that are mutually separated by empty spaces.

7. A machine for boxing products, comprising:

a line for the supply and sorting of products on a gathering surface and at least one line for conveying boxes, which is arranged to the side of said gathering surface, externally to said line for conveying boxes there being a station for picking up the products from said surface and subsequent insertion into said box that is present on said line for conveying boxes, wherein said pickup station comprises a movement arm that is articulated with respect to a fixed frame and supports, at its free end, at least one respective grip means for at least one product, said free end of said arm comprising at least one track for at least two carriages for supporting at least one respective shaft that supports said grip means, a first linear actuator, which is substantially parallel to a direction of said track, being associated with a first one of said carriages for its movement along said track, from a configuration of separation, wherein said tracks are a plurality and are mutually side by side and parallel, wherein each of said tracks comprises a plurality of carriages, the carriage that lies furthest from said end of said arm being fixed on said track so as to constitute a stroke limiter for the other of said carriages that are present on said track, and wherein said first linear actuator comprises a rack-and-pinion assembly, said pinion being keyed to the shaft of a movement motor that is controlled by a control unit, said rack-and-pinion being integral with the carriage that lies closest to the end of said arm, and with consequent height variation of the respective grip means between a first configuration of coplanarity of all of the grip means and a second configuration of height variation of each grip means with respect to the contiguous ones, in a longitudinal direction and in a transverse direction; and further comprising a rail along which said tracks are configured to slide transversely to bring said grip means closer transversely, the rail comprising respective controlled movement motors configured for managing the compaction of said tracks slidable thereon.

* * * * *